United States Patent
Tang

Patent Number: 5,215,017
Date of Patent: Jun. 1, 1993

[54] SYSTEM AND METHOD FOR FEEDING PASTE MATERIAL OR SLURRY INTO A FURNACE

[75] Inventor: John T. Tang, Easton, Pa.

[73] Assignee: Foster Wheeler Energy Corporation, Clinton, N.J.

[21] Appl. No.: 826,556

[22] Filed: Jan. 27, 1992

[51] Int. Cl.⁵ .......................... F23K 1/00; F23K 3/00
[52] U.S. Cl. .................... 110/106; 110/232; 241/38; 241/42
[58] Field of Search ............... 110/106, 232; 241/18, 241/38, 42

[56] References Cited

U.S. PATENT DOCUMENTS

| | | |
|---|---|---|
| 408,285 | 8/1889 | Boehning . |
| 1,599,952 | 9/1926 | Brown et al. . |
| 2,494,070 | 1/1950 | Thomas ............................ 110/106 |
| 2,637,915 | 5/1953 | Weiss . |
| 2,697,881 | 12/1954 | Kelley . |
| 2,876,862 | 3/1959 | Hummell . |
| 2,929,152 | 3/1960 | Berner . |
| 3,155,474 | 11/1964 | Sexton . |
| 3,484,948 | 12/1969 | Whelan . |
| 3,508,339 | 4/1970 | Neblett et al. . |
| 3,757,892 | 9/1973 | Raudman, Jr. . |
| 3,958,966 | 5/1976 | Keller . |
| 4,123,241 | 10/1978 | Maden . |
| 4,147,116 | 4/1979 | Graybill . |
| 4,241,673 | 12/1980 | Smith et al. . |
| 4,480,557 | 11/1984 | Hochmuth . |
| 4,497,263 | 2/1985 | Vatsky et al. . |
| 4,611,543 | 9/1986 | Collette ............................. 110/106 X |
| 4,749,133 | 6/1988 | Sayler et al. ..................... 110/106 X |

*Primary Examiner*—Edward G. Favors
*Attorney, Agent, or Firm*—Marvin A. Naigur

[57] ABSTRACT

A fuel feed system and method for feeding low grade fuels to a fluidized bed furnace including an enclosure with a fuel inlet for introducing the fuel into the enclosure, an inlet for introducing air into the enclosure so as to propel the fuel through the enclosure, and baffles disposed in the path of the fuel in a manner to reduce the size of the fuel particles prior to the introduction of the fuel into the furnace.

27 Claims, 1 Drawing Sheet

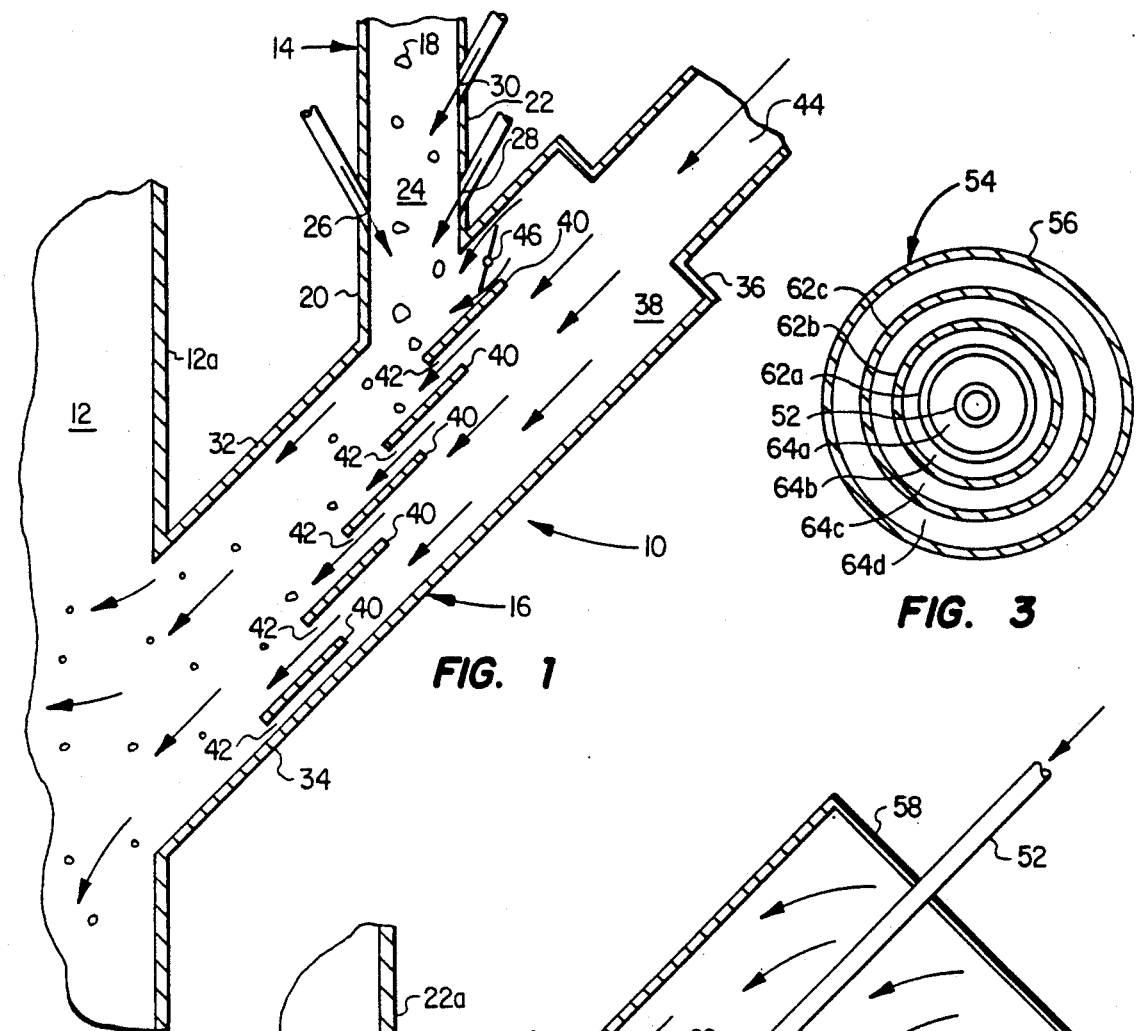
FIG. 1
FIG. 3
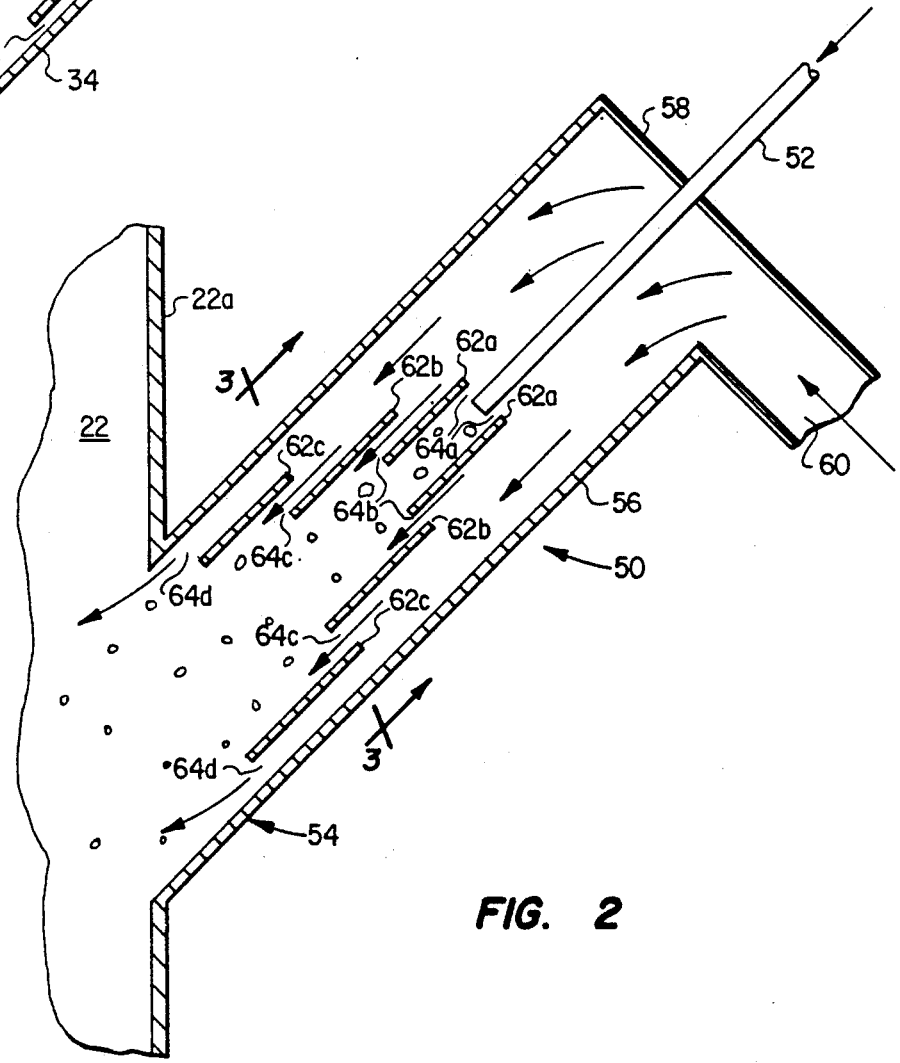
FIG. 2

SYSTEM AND METHOD FOR FEEDING PASTE MATERIAL OR SLURRY INTO A FURNACE

BACKGROUND OF THE INVENTION

This invention relates to a system and method for feeding fuel to a fluidized bed furnace and more particularly to such a system and method utilizing a pneumatic transport for low grade fuels having high water content and substantial adhesive properties.

The use of pneumatic transports for fluidized beds is generally known. For example, Whelan, U.S. Pat. No. 3,484,948, discloses a pneumatic transport for particulate material including an apparatus for exchanging heat between a gas and the particulate matter. However, the use of pneumatic transports in a fuel feed system for low grade industrial and municipal waste fuels in the form of paste or slurry present several distinct problems. For example, waste fuels often have significant adhesive properties that are associated with their relatively high water content. Also, waste fuels have a low heating value, as well as a high concentration of salts. Further, the quality and characteristics of waste fuels can vary considerably over time. Consequently, feeding of these fuels to a furnace for incineration is difficult, and improper feed systems can result in unstable furnace combustion, high pollutant emission, furnace slagging, and the formation of agglomerations within both the feed system and furnace.

SUMMARY OF THE INVENTION

It is therefore an object of the present invention to provide a system and method for feeding fuel from a supply to a furnace.

It is a further object of the present invention to provide a system and method of the above type in which the fuel's water content is reduced.

It is a further object of the present invention to provide a system and method of the above type in which the incidence and severity of agglomeration formation is reduced.

It is a further object of the present invention to provide a system and method of the above type in which substantial momentum is imparted to the fuel for furnace penetration.

It is a further object of the present invention to provide a system and method of the above type in which fuels can be fed at a variable velocity.

It is still a further object of the present invention to provide a system and method of the above type which affords a more stable combustion in the vicinity of the feed ports.

Toward the fulfillment of these and other objectives, the fuel feed system and method of the present invention features a fuel distributor containing a plurality of baffles defining a series of slots through which preheated, high-pressure air is supplied to produce regions of low pressure. In a preferred embodiment, the fuel in the form of paste is supplied to a downcomer duct where it accelerates downward due to gravity and with the aid of tangentially supplied high-velocity gas or air. From the downcomer duct, the fuel quickly passes into a downwardly sloping distributor which connects the duct to the fluidized bed furnace. In the distributor, the fuel particles encounter the aforementioned baffles in the form of plurality of descending grid plates which define a series of slots. Preheated air is supplied to the back of the distributor and forced through the slots creating a series of regions of reduced pressure. Thus, relatively large particles of fuel obtain sufficient momentum to impact against the grid plates resulting in the fuel being broken down into numerous relatively smaller particles. In addition, the preheated air removes any particles that might adhere to the grids. After encountering a series of these grids, the fuel has substantially reduced moisture content, and consequently, reduced adhesive properties.

In an alternate embodiment, a similar concept is used to reduce the water content, adhesive properties, and particle size of slurry waste fuels to be fed into a fluidized bed reactor. However, instead of using a series of grids, a series of concentric cylindrical pipes are used as baffles and define a plurality of annular slots within the fuel distributor. Preheated air is supplied to the back of the distributor and forced through the slots creating a series of regions of reduced pressure. Thus, the relatively large particles of fuel obtain sufficient momentum to impact the pipes to break the particles down into numerous relatively smaller particles. In addition, the preheated air removes any particles that might adhere to the pipes. After encountering a series of these pipes, the fuel has substantially reduced moisture content, and consequently, reduced adhesive properties.

As a result of traversing the fuel distributors in the aforementioned embodiments, moisture content and the associated agglomeration tendencies of the waste fuels are substantially reduced. Further, significant momentum is imparted to the fuels providing for better penetration and dispersion within the furnace. This results in increased combustion stability, lower pollution emissions, and reduced slagging and agglomeration tendencies within the furnace.

BRIEF DESCRIPTION OF THE DRAWINGS

The above description, as well as further objects, features, and advantages of the present invention, will be more fully appreciated by reference to the following detailed description of the presently preferred but nonetheless illustrative embodiments in accordance with the present invention when taken in conjunction with the accompanying drawings wherein.

FIG. 1 is a cross-sectional, schematic view of the preferred embodiment of the fuel feed system of the present invention;

FIG. 2 is a cross-sectional, schematic view of the alternate preferred embodiment of the fuel feed system of the present invention; and FIG. 3 is a sectional view taken along line 3—3 in FIG. 2.

DESCRIPTION OF THE PREFERRED EMBODIMENT

Referring to FIG. 1 of the drawings, the reference numeral 10 generally refers to the fuel feed system of the present invention. The feed system 10 serves as a pneumatic transport of fuels, such as pasty waste fuels, from a fuel supply, not shown, to a fluidized bed reactor 12 shown in part by the front wall 12a. The feed system 10 includes a vertical downcomer duct 14 which registers with an opening in a downwardly sloping fuel distributor 16 along which a plurality of fuel particles 18 are conveyed by action of gravity and tangentially supplied air or gas flow. The input end of duct 14 is supplied with fuel particles 18 by suitable equipment, such as, a screw feeder and hopper, not shown. The duct 14 is formed by two spaced, parallel walls 20 and 22 and by two spaced, parallel side walls, one of which is shown by the reference numeral 24 to form a substantially rectangular enclosure. An air inlet conduit 26 registers with an opening in the wall 20 and two air inlet conduits 28 and 30 register with openings in the wall 22. The conduits 26, 28 and 30 are inclined at an acute angle to the longitudinal axis of the duct 14 and are supplied with preheated air form an external source, not shown.

The distributor 16 is formed by two spaced, parallel walls 32 and 34, by an inlet wall 36, and by two spaced, parallel side walls, one of which is shown by the reference numeral 38, to form a substantially rectangular enclosure. The side walls, including wall 38, provide structural support to a plurality of perpendicularly attached baffles or grid plates 40 that are arranged in a staircase step fashion along the length of the distributor 16 and are spaced apart to define a plurality of slots 42. It is understood that the grid plates 40 are supported between the side walls, including wall 38, in any conventional manner.

An inlet conduit 44 registers with an opening in the inlet wall 36 for supplying preheated air to the distributor 16 and a damper 46 is disposed between the top grid 40 and the wall 32 to control the flow of air as will be described.

While not shown, it is understood that suitable apparatus is provided for supplying air or gas to the inlet conduits 26, 28, 30 and 44 at a predetermined temperature and pressure. An example of such apparatus consist of a suitable blower connected in series to a heater which, in turn, is connected in series to a plurality of butterfly valves which regulate air pressure to the conduits 26, 28, 30 and 44.

In operation, preheated, pressurized air is introduced to the duct 14 by the conduits 26, 28 and 30 and to the distributor 16 by conduit 44. The relatively large solid particles 18 of waste fuel material are supplied to the duct 14 in any known manner such as by a screwfeeder and hopper (not shown). Upon entering the duct 14 the fuel particles 18 are accelerated by gravity and by the pressurized air injected through the conduits 26, 28 and 30. The particles 18 are thus propelled into the distributor 16 where they are impinged upon by the high velocity air streams from the conduit 44 which pass through the slots 42. The air streams create regions of low pressure whereby the relatively large particles 18 obtain sufficient momentum to impact the grids 40 to break down the large particles 18 into numerous relatively smaller particles. In addition, the preheated air from the conduit 44 removes any particles which might adhere to the grid plates 40. Thus an emulsion of relatively small particles 18 and air is formed and fed to the furnace 12. The damper 46 is used to regulate the tangential air flow across the opening between the distributor 16 and the duct 14, and consequently, provides for better fuel feed control.

Referring to FIG. 2 of the drawings, the reference numeral 50 generally refers to an alternate embodiment of the feed system of the present invention. The feed system 50 serves as a pneumatic transport of fuels, such as slurry waste fuels, from a fuel supply, not shown, to a fluidized bed reactor 12 shown in part by the front wall 12a. The feed system 50 includes a downwardly sloping high pressure fuel pipe 52, extending into a co-axially disposed fuel distributor 54 along which fuel particles are conveyed by action of gravity and tangentially supplied air or gas. The input end of the fuel pipe 52 is supplied with fuel by suitable equipment, such as, a fuel pump and tank, not shown. The distributor 54 is formed by a downwardly sloping, cylindrical housing 56 that registers at one end with an opening through the furnace front wall 12a. An end wall 58 extends over the other end of the housing 56 and an inlet conduit 60 registers with an opening defined between the housing 56 and the wall 58. A plurality of concentric cylindrical baffles or pipes 62A–62C are supported in a coaxial relationship in the housing 68 with the diameter of the pipe 62A being less than the diameter of the pipe 62B, and the diameter of the latter pipe being less than the diameter of the pipe 62C. The structural support(s) for the pipes 62A–62C is omitted from FIGS. 2 and 3 for the purpose of clarity, however, it is understood that the pipes are supported in the housing 56 in any conventional manner. The pipes 62A–62C are axially spaced along the axis of the housing 56 with an end of the pipe 62A extending in the corresponding end of the pipe 62B, and the end of the latter pipe extending in the corresponding end of the pipe 62C.

The fuel pipe 52 extends into the distributor 54 through the wall 58 and slightly into the corresponding end portion of the smallest pipe 62A. The fuel pipe 52, the pipes 62A–62D, and the housing 56 are sized and positioned so as to define four annular slots 64A–64D between adjacent cylindrical members with the outer diameter of the slot 64A being less than the outer diameter of the slot 64B, and the outer diameter of the slot 64B less than the outer diameter of the slot 64C, and the outer diameter of the slot 64C less than the outer diameter of the slot 64D. The slots 64A–64D are distributed along the length of the distributor 16 with the slot 64A being located approximately in the center of the distributor and the slot 64D being located adjacent to the wall 22a.

While not shown, it is understood that suitable apparatus is provided for supplying air or gas to the inlet conduit 60 at a predetermined temperature and pressure. An example of such apparatus is a suitable blower connected in series to a heater which, in turn, is connected in series to a butterfly valve which regulates air pressure to conduit 60.

In operation, preheated pressurized air is introduced to the housing 56 by the conduit 60, and is directed through the housing and therefore through the annular slots 64A–64C between the pipes 62A–62C. Fuel in the form of, for example, slurry is supplied to the pipe 52 by suitable means, such as, a pump which is not shown. The fuel is pumped through the pipe 52 and enters the distributor 54 as a plurality of particles which are impinged upon by the relatively high-velocity air-streams from the conduit 60 which pass through the slot 64A–64D. The air streams create regions of low pressure and great air shear force which break and propel the particles radially and in such a manner to aid in the atomization and dehydration of the slurry. As in the previous embodiment, relatively large particles obtain sufficient momentum from the regions of low pressure to impact against the pipes 62A–62C resulting in the particles being reduced in size. In addition, the preheated air is supplied with sufficient pressure and flow rate through the conduit 60 to remove any particles adhering to the pipes 62A–62C. Thus an emulsion of air and small particles is formed which is propelled into the furnace 12.

The system and method of both embodiments of the present invention have several advantages over the prior art. For example, the preheated air forced between baffles in the form of grid plates 40 or concentric pipes 62A-62C sweeps away any adhering fuel while reducing the moisture content of the particles and braking the particles. As adherence properties are strongly related to moisture content, the adherence properties and agglomerating tendencies are also reduced. In addition, the fuel transported can vary in moisture concentration, adhesive properties, salt concentration, or amount of usable fuel without significant adverse effects to either the furnace or the feed system. Also, the use of the forced air imparts significant momentum to the fuel flow, providing for furnace penetration and resulting in increased furnace combustion stability with an associated reduction in pollutant emissions. Further, the forced air through the distributor allows a continuous range of velocities in which fuels can be transported.

Although not specifically illustrated in the drawings, it is understood that additional necessary equipment and structural components will be provided, and that these and all components described above are arranged and supported in an appropriate fashion to form a complete and operative system.

It is also understood that variations may be made in the method of the present invention without departing from the scope of the invention. For example, the fuel distributor need not be cylindrical or rectangular, but could be of any geometric shape. Similarly, the baffles need not in the form of grid plates or cylindrical pipes, but could be of any geometric shape. Of course, other variations can be made by those skilled in the art by not departing from the invention as defined in the appended claims.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A particle feed system comprising an enclosure, means for introducing particles into said enclosure for passage through said enclosure, a plurality of baffles disposed in said enclosure in the path of said particles in a spaced, partially-overlapping, receding relation for allowing said particles to impact against said baffles, to cascade from one baffle to the next baffle and to break up said particles, and means for introducing air into said enclosure for propelling said particles against said baffles.

2. The system of claim 1 wherein said particle-introducing means comprises an inlet conduit connected to, and registering with, said enclosure.

3. A particle feed system comprising an enclosure, an inlet conduit registering with said enclosure for introducing particles into said enclosure for passage through said enclosure, a plurality of rectangularly-shaped baffles disposed in said enclosure in the path of said particles in a generally parallel relation to one another for allowing said particles to impact against said baffles and break up said particles, and means for introducing air into said enclosure for propelling said particles against said baffles.

4. The system of claim 3 wherein said baffles are disposed in a spaced relation.

5. The system of claim 2 or 3 wherein said inlet conduit extends substantially vertically and at an angle to said enclosure to impart gravitational acceleration to said particles as they enter said enclosure.

6. The system of claim 2 or 3 wherein said air-introducing means introduces air to said inlet conduit to propel said particles through said inlet conduit into said enclosure.

7. The system of claim 1 or 4 further comprising means for introducing an additional air into the spaces between said baffles to propel said particles through said enclosure.

8. The system of claim 2 wherein said baffles are cylindrically-shaped and disposed in a concentric, spaced relation with the smallest diameter baffle positioned to impact said particles first so as to allow said particles to cascade from the smaller diameter baffles to the larger diameter baffles.

9. The system of claim 8 wherein said inlet conduit extends axially with said enclosure.

10. The system of claim 8 wherein said air-introducing means introduces air to said enclosure in a direction perpendicular to the flow of said particles through said enclosure.

11. A fuel feed system comprising an enclosure, means for introducing particles into said enclosure for passage through said enclosure, baffled means disposed in said enclosure in the path of said particles for impacting with said particles to break up said particles, means for introducing a first quantity of air into said enclosure in a direction to propel said particles against said baffle means to promote said impaction, and means for introducing a second quantity of air into said enclosure in a direction to propel said particles through said enclosure.

12. The system of claim 11 wherein said particle-introducing means comprises an inlet conduit registering with said enclosure.

13. The system of claim 12 wherein said inlet conduit extends substantially vertically and at an angle to said enclosure to impart gravitational acceleration to said fuel particles as they enter said enclosure.

14. The system of claim 12 wherein said means for introducing said first quantity of air introduces said latter air to said inlet conduit to propel said fuel particles through said inlet conduit into said enclosure.

15. The system of claim 11 wherein said baffle means comprises a plurality of spaced baffles, said second quantity of air passing through the spaces between said baffles.

16. The system of claim 15 wherein said baffles are rectangularly-shaped and disposed in a generally parallel relation to one another.

17. A particle feed system comprising an enclosure, an inlet conduit registering with said enclosure for introducing particles into said enclosure for passage through said enclosure, said inlet conduit extending substantially vertically and at an angle to said enclosure to impart gravitational acceleration to said particles as they enter said enclosure, baffle means disposed in said enclosure in the path of said particles for impacting with said particles to reduce the sizes of said particles, said baffle means defining a plurality of slots, means for introducing air to said inlet conduit to propel said particles through said inlet conduit into said enclosure for impinging on said particles to propel said particles against said baffle means to promote said impaction, and means for introducing additional air directly into said enclosure and into said slots.

18. The system of claim 17 wherein said baffle means comprises a plurality of baffles disposed in a spaced, partially-overlapping, receding relation to allow said particles to cascade from one baffle to the next baffle.

19. The system of claim 18 wherein said baffles are rectangularly-shaped and disposed in a generally parallel relation to one another.

20. A particle feed method comprising the steps of introducing particles into an enclosure through an inlet conduit registering with said enclosure, directing said particles against a baffle in said enclosure so that said particles impact against said baffle to break up said particles, and introducing air into said inlet conduit to propel said particles through said inlet conduit into said enclosure and to propel said particles against said baffle.

21. The method of claim 20 wherein there are a plurality of spaced baffles and further comprising the step of introducing additional air directly into said enclosure and into the spaces between said baffles to propel said particles through said enclosure.

22. The method of claim 21 wherein said additional air is introduced at sufficient velocity to prevent said particles from adhering to said baffles.

23. A particle feed method comprising the steps of introducing fuel particles into an enclosure for passage through said enclosure, directing said fuel particles against a baffle in said enclosure so that said particles impact against said baffle to break up said particles, introducing a first quantity of air into said enclosure in a direction to propel said particles against said baffles to promote said impaction, and introducing an additional quantity of air into said enclosure in a direction to propel said particles through said enclosure.

24. The method of claim 23 wherein said fuel is introduced through an inlet conduit registering with said enclosure and said first quantity of air is introduced to said inlet conduit to propel said fuel particles through said inlet conduit into said enclosure.

25. The method of claim 23 or 24 wherein said second quantity of air is introduced directly into said enclosure.

26. The method of claim 25 where said second quantity of air is introduced at sufficient velocity to prevent said particles from adhering to said baffle.

27. The method of claim 26 wherein there are a plurality of spaced baffles and wherein said additional quantity of air is introduced into the spaces between said baffles.

* * * * *